Feb. 11, 1930.  O. C. REEVES  1,746,362
WEIGHING SCALE
Filed Jan. 24, 1927
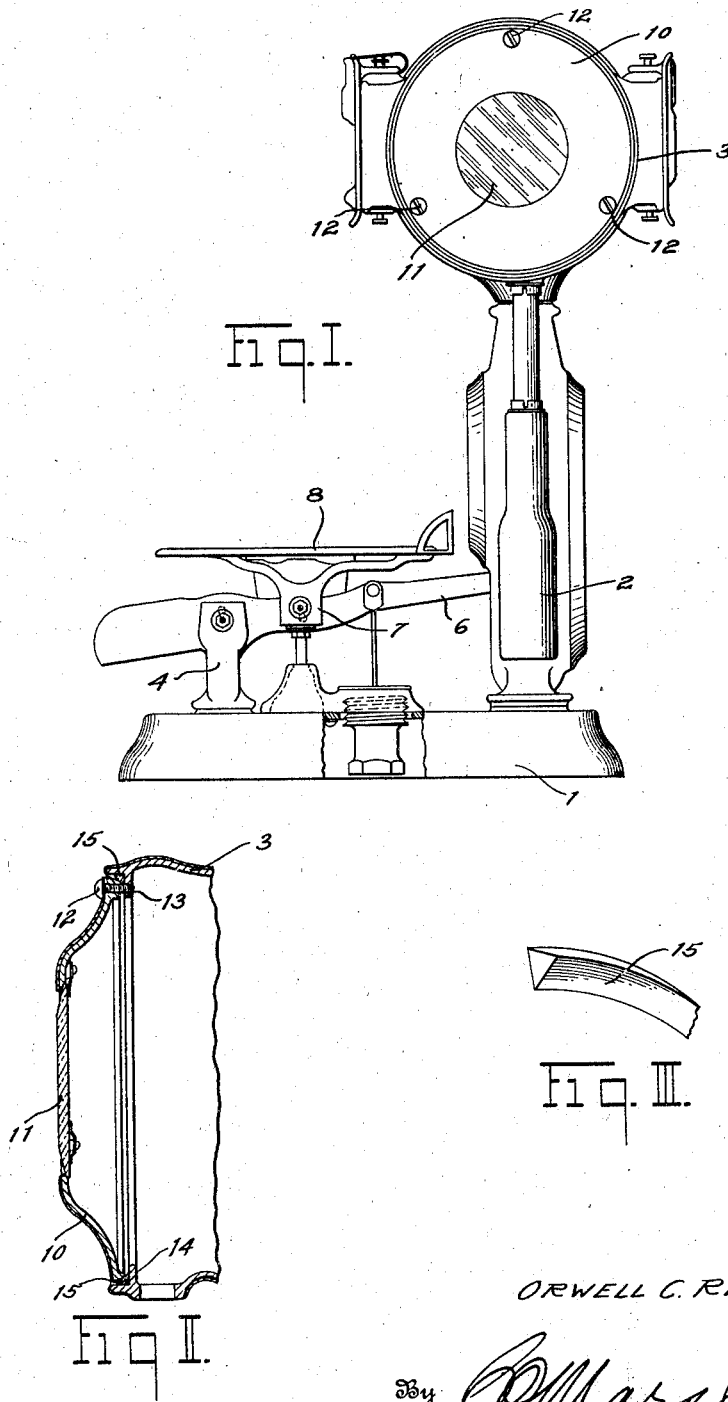
Fig. I.
Fig. II.
Fig. III.
Inventor
ORWELL C. REEVES
By  CM Marshall
Attorney Patented Feb. 11, 1930

1,746,362

UNITED STATES PATENT OFFICE

ORWELL C. REEVES, OF TOLEDO, OHIO, ASSIGNOR TO TOLEDO SCALE COMPANY, OF TOLEDO, OHIO, A CORPORATION OF NEW JERSEY

WEIGHING SCALE

Continuation of application Serial No. 717,033, filed May 31, 1924, and in Canada July 11, 1924. This application filed January 24, 1927. Serial No. 163,001.

This is a continuation of my application for improvements in weighing scales, Serial Number 717,033, filed May 31, 1924, and relates particularly to scales of the so-called cylinder type, and one of its principal objects is to construct a satisfactory joint between various elements of the scale frame when such elements are finished in porcelain enamel or other vitreous coating.

Another object is to improve the appearance of the joints.

Another object is to facilitate the manufacturing and assembling operations in building scales of this type.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevaton of a weighing scale of the cylinder type built in accordance with my invention;

Figure II is a fragmentary sectional detail view through the chart housing showing the method of retaining the end cover plates;

Figure III is a fragmentary detail of a portion of a gasket used at the joints between the end plate and the scale frame.

Referring to the drawings in detail, the scale consists substantially of a base 1, one end of which supports a column 2 surmounted by a substantially cylindrical casing 3. Upon the other end of the base 1 is erected a fulcrum stand 4, the latter pivotally supporting a lever 6 also provided with load pivots and supporting a spider 7 surmounted by a commodity-receiver or platter 8. The nose end of the lever projects into the column 2 and is connected to suitable load-counterbalancing mechanism (not shown) housed within the column and to indicating mechanism supported within the cylindrical housing 3. The general construction and operation of the scale is similar to that illustrated and described in U. S. patent to Hapgood, No. 1,166,128, patented December 28, 1915.

The framework, housings and the exposed working parts of the scale of the present invention are, however, intended to be finished in porcelain enamel or other vitreous coating.

I have constructed the cylindrical chart housing 3 in the form of an integral casting, as the porcelain enamel tends to coat uniformly and upon which non-uniformity of coating is not apparent. The sides of the housing 3 are closed by means of circular closures 10 which are preferably provided with windows 11 through which a portion of the indicator and its operating mechanism are visible. In order to provide a neat dust-proof joint between the closure 10 and the chart housing 3 the closure is made of such size that it may be inserted in the opening in the side of the chart housing. The closure 10 is held in place by means of screws 12 which are threaded into bosses 13 in an inwardly extending annular flange 14 adjacent the opening in the side of the chart housing. In order to prevent strains from being set up by a tightening of the screws 12 and to eliminate chipping of the glazed finish on the housing 3 and the closure 10, as well as to form a water-tight and dust-proof joint between the closure and the housing, a flexible rubber gasket 15 of triangular cross section is inserted between the closure and housing. Since the gasket lies against the flange 14, it is forced outwardly against the wall of the housing and more tightly against the flange 14 by tightening the screws 12.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale housing wherein a joint is formed between certain of the wall sections having an enamel coating, means for preventing chipping of such enamel coating at said joint comprising a seat on one element carrying a resilient packing upon which the other element is seated and means for drawing the two elements together on the packing whereby a tight joint is formed without contact between the enameled surfaces.

2. A weighing scale housing coated with porcelain enamel and having an opening therein, a shoulder in said opening, a resilient gasket of triangular cross-section surrounding said opening and lying against said shoulder, a cover also coated with porcelain set within said opening and lying against said gasket, and means for drawing down said cover on said gasket whereby a tight joint is formed without contact between the enameled surfaces of the housing and the cover.

ORWELL C. REEVES.